United States Patent [19]
Kaminski

[11] Patent Number: 5,119,924
[45] Date of Patent: Jun. 9, 1992

[54] ARTICLE FEEDING APPARATUS
[75] Inventor: Elton G. Kaminski, Sidney, Ohio
[73] Assignee: The Stolle Corporation, Sidney, Ohio
[21] Appl. No.: 421,510
[22] Filed: Oct. 12, 1989

Related U.S. Application Data

[62] Division of Ser. No. 262,526, Oct. 25, 1988, Pat. No. 5,025,916.

[51] Int. Cl.⁵ ............................................. B65G 17/34
[52] U.S. Cl. .............................. 198/803.15; 198/834; 198/835
[58] Field of Search .................. 198/834, 835, 803.15; 474/167

[56] References Cited

U.S. PATENT DOCUMENTS

| | | | |
|---|---|---|---|
| 3,231,065 | 1/1966 | Kaminski | 198/834 X |
| 3,430,506 | 3/1969 | Stone | 198/835 |
| 3,642,120 | 2/1972 | Duhan | 198/834 |
| 3,812,953 | 5/1974 | Maschke | 198/834 X |
| 3,980,174 | 9/1976 | Conrad | 198/835 |
| 4,290,761 | 9/1981 | Suginaka | 198/835 |
| 4,449,958 | 5/1984 | Conrad | 198/834 X |
| 4,543,080 | 9/1985 | Tangorra | 198/834 X |
| 4,553,951 | 11/1985 | Pavone | 474/167 X |
| 4,568,320 | 2/1986 | Tangorra | 198/834 X |

FOREIGN PATENT DOCUMENTS

| | | |
|---|---|---|
| B4416485 | 1/1986 | Australia . |
| 2057334 | 6/1972 | Fed. Rep. of Germany . |
| 3234724A1 | 3/1984 | Fed. Rep. of Germany . |
| 2042949 | 10/1980 | United Kingdom . |
| 2111414 | 7/1983 | United Kingdom . |

Primary Examiner—D. Glenn Dayoan
Attorney, Agent, or Firm—Frost & Jacobs

[57] ABSTRACT

An apparatus for intermittently feeding a series of like articles along a path so as to present them in succession to a plurality of operation stations, where operations are performed upon the articles in sequence. The apparatus is provided with at least a pair of space drums mounted on parallel axis and a one piece non-metallic, substantially nonstructurable belt passing around the drums. The surface of the driven drum is textured to cooperate with the inner surface of the belt to prevent slippage therebetween. Longitudinal ribs may be formed in the inner surface of the belt.

10 Claims, 7 Drawing Sheets

ARTICLE FEEDING APPARATUS

This is a division, of application Ser. No. 07/262,526, filed Oct. 25, 1988, now U.S. Pat. No. 5,025,916.

TECHNICAL FIELD

The present invention relates generally to an article feeding apparatus and is particularly directed to an apparatus suitable for feeding a succession of articles upon which a series of operations is to be performed, in a step by step manner, along a path so as to deliver each article in succession to a plurality of operating stations at which certain operations are to be performed upon the article. The invention will be specifically disclosed in connection with an apparatus having a driven drum which has a textured peripheral surface which prevents slippage between the driven drum and a belt which transports work pieces.

BACKGROUND OF THE INVENTION

Intermittent feed conveyers comprising an article transfer belt and two or more parallel shaft drums about which the belt is located are known in the industry. Such apparatuses are used to transfer a work piece through a series of positions at which a number of operations may be carried out upon the work piece. In order to transfer each work piece from one work station to the next work station, it is necessary to intermittently drive the belt holding the work pieces a predetermined distance which corresponds to the spacing of the work stations. To accomplish this, the belt is rapidly accelerated from a stationary condition, transported a predetermined distance, and rapidly decelerated to a stationary condition, thereby locating the work piece at the next station. In order to achieve the high production speeds necessary in such apparatuses, it is extremely critical that the belt locate the work piece precisely at each work station To achieve the necessary precision, no slippage can be allowed between the driven drum and the belt In U.S. Pat. No. 3,231,065 to Kaminski, et al, a feeding apparatus is disclosed having a stainless steel belt which has sprocket holes along at least one edge of the belt. The belt is driven by a drum which has a sprocket disc attached to the drum. The teeth of the sprocket disc extend into the sprocket holes along the edge of the belt, thus preventing relative motion between the metallic belt and the drum. The belt also has apertures in which the articles can be seated in order to be carried by the belt. The articles which are particularly disclosed are beverage can ends.

While the apparatus of U.S. Pat. No. 3,231,065 has generally proven to be satisfactory, problems have arisen with the use of a metallic belt Belts were found to fail in service due to cracks which propagated in the belt from the sprocket holes into the article carrying apertures. The failures occur because the fatigue limit, in terms of number of bending cycles around the drums, has been reached.

In response to the problems of metallic belts, the prior art also developed along the lines of fabric impregnated with neoprene or the like which had non-stretchable elements embedded therein. However, as with the metallic belts, a non-stretchable, non-metallic belt must also not slip with respect to the driven drum. To prevent slippage, various configurations have been devised.

One such configuration is disclosed in U.S. Pat. No. 3,812,953 to Maschke. In Maschke, a plurality of radially extending plugs are arranged on the peripheral surface of the driven drum, as well as on the peripheral surface of the idler drum. The plugs are arranged and configured to fit snugly into the article feeding apertures formed in the belt. The plugs drive the belt in unison with the rotation of the driven drum, while maintaining the relative position of the belt with respect to the drum, thereby preventing slippage As was disclosed therein, the belt was anticipated to be either metallic or non-metallic, non-stretchable.

A major problem occurs with the use of radially extending plugs in combination with a non-stretchable, non-metallic belt A non-metallic does not possess the bearing strength necessary to drive the belt via the plugs. When used in this combination, the non-metallic belt prematurely fails due to over stressing the belt. Furthermore, when the force used in a driving non-metallic belt is sufficient to drive the belt via the plugs, the force is also sufficient to allow the plugs to "flair" the belt openings. This "flairing", or stretching of the belt openings, results in positioning errors due to the localized deformation of the belt openings This is particularly noticeable at the high intermittent speeds at which such apparatuses operate.

U.S. Pat. No. 4,289,231 to Kaminski discloses the use of low inertia drums in combination with a substantially non-stretchable belt which has inwardly projecting teeth that mesh with axially aligned sprocket teeth that are located about the periphery of the driving drum While this represents one method of maintaining the accuracy necessary to successfully operate such apparatuses, the art is continually seeking to improve the performance and reliability of the apparatuses.

Forming axial teeth, as well as manufacturing the low inertia drums as disclosed in U.S. Pat. No. 4,289,231, is costly. Furthermore, there is a need in the art to reduce the tension induced in the belt by the take up drum to as low a level as is practically possible in order to extend the life of the non-metallic, non-stretchable belt. To these ends, the present invention offers significant improvements over the prior art.

SUMMARY OF THE INVENTION

Accordingly, it is a primary object of the present invention to provide an improvement in an apparatus for intermittently feeding a series of like articles along a path through the use of a non-metallic, non-stretchable belt while preventing slippage between the driven drum and the belt.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved article feeding apparatus is provided for preventing relative slippage between the feeding belt and the driven drum. The apparatus includes a pair of spaced drums mounted on parallel axes, each of the drums having peripheral surfaces A substantially non-stretchable, non metallic belt having an inner surface passes around both drums in partial contact with the peripheral surfaces. Means are provided for intermittently driving one of the drums to move the belt a predetermined distance. The peripheral surface of the driven drum is textured, thereby configured to cooperate with the inner surface of the belt. The textured surface prevents slippage between the belt and the driven drum.

In accordance to a further aspect of the invention, the textured peripheral surface of the driven drum is formed by the process of etching the peripheral surface.

According to a further aspect of the invention, the textured peripheral surface of the driven drum is formed by particle blasting the peripheral surface.

In yet another aspect of the invention, the textured peripheral surface of the driven drum is formed by knurling the peripheral surface.

In still a further aspect of the invention, the inner surface of the belt is formed of material which has a low durometer hardness.

In accordance to yet another aspect of the invention, a plurality of longitudinal ribs are formed in the inner surface of the belt.

According to a still further aspect of the invention, each longitudinal rib has a truncated triangular cross section.

In still a further aspect of the invention, a series of equally spaced article receiving apertures shaped to fit the articles are formed in the belt. A plurality of equally spaced plugs are disposed on the peripheral surface of the driven drum which extend radially outwardly from the peripheral surface. Each of the plugs are configured to fit snugly into the apertures of the belt, thereby preventing slippage between the belt and the driven drum.

In still another aspect of the invention, means for axially aligning the plugs in relation to the driven drum are provided.

In yet another aspect of the invention, a plurality of dove-tail notches are disposed about the circumference of the driven drum, and a plurality of dove-tail inserts are disposed in the notches. The dove-tail inserts are configured to cooperate with the notches. The plugs are attached to the inserts by a plurality of threaded fasteners.

In accordance with another aspect of the invention, a plurality of ribs disposed axially about the peripheral surface of the driven drum extend radially outward therefrom.

Still other objects of the present invention will become apparent to those skilled in this art from the following description wherein there is shown and described preferred embodiments of this invention simply by way of illustration, of the best mode to contemplate it for carrying out the invention. As will be realized, the invention is capable of other embodiments, and in several details, are capable of modification and various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the inventions. In the drawings

Reference will now be made in detail to the present preferred embodiment of the invention, an example of which is illustrated in the accompanying drawings.

DETAILED DESCRIPTION OF THE PREFERRED EMBODIMENT

Figure 1:
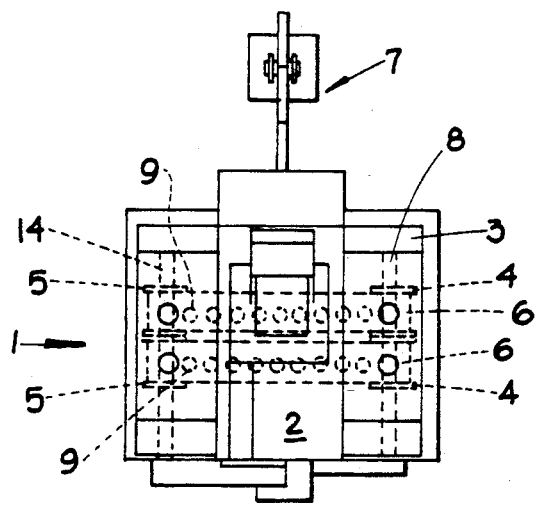
FIG. 1 is a diagrammatic plan view of an article feeding apparatus.

Referring to FIG. 1, there is indicated an article feeding apparatus 1 of the invention which comprises a frame 2 which serves to carry the apparatus for operating on the workpieces or articles. In the present case, this includes a plurality of cooperating dies, but since these do not form any part of the present invention, they are not shown.

Frame 2 is also provided with a bed 3 which serves as a support for the conveying apparatus which forms the object of the present invention. The conveying apparatus is comprised by one or more driven drums 4, one or more associated idler or take up drums 5 and at least one belt 6 of a substantially non-stretchable, non-metallic material passing around the drums 4 and 5. The driven drums 4 are fixed as to their position while the idler drums 5 are rotatably mounted on a carriage (not shown) which may be moved so as to adjust the distance between the drums 4 and 5 to control the tension in the belt 6. A suitable drive mechanism shown generally at 7 is provided for driving shaft 8 which is connected to driven drum 4. Since the intermittent drive mechanism forms no part of the present invention, it has not been described in detail.

A plurality of article carrying apertures 9 are shown formed in belt 6, arranged in a sequential row of apertures 9. Work pieces, or articles, such as can ends, are loaded into apertures 9 by an appropriate means (not shown) and travel from one end of the apparatus with intermittent stops, to the other end of the apparatus. The intermittent stops correspond to the spacing of the apertures 9 in belt 6 with respect to the distinct locations of the work stations of the article feeding apparatus 1.

In order to perform an operation on an article, it is necessary that the belt 6 be precisely aligned and stationary with respect to the work station at the time the operation is performed. After the operation has been completed at each work station, the driven drum 4 drives the belt 6 a predetermined distance, at which location the belt 6 is stopped and held stationary for the next operation at the successive work station. As is obvious, it is not necessary that the aperture 9 formed in the belt 6 be spaced equal to a distance between subsequent work stations. In order to optimize the performance of the article feed apparatus 1, the distance between each successive work station need only be equal to a multiple of the distance between the centers of each successive aperture 9. As is further obvious, each successive work station need not be equally spaced, but only need be spaced in integer multiples of the distance between the centers of the apertures 9.

Figure 2:
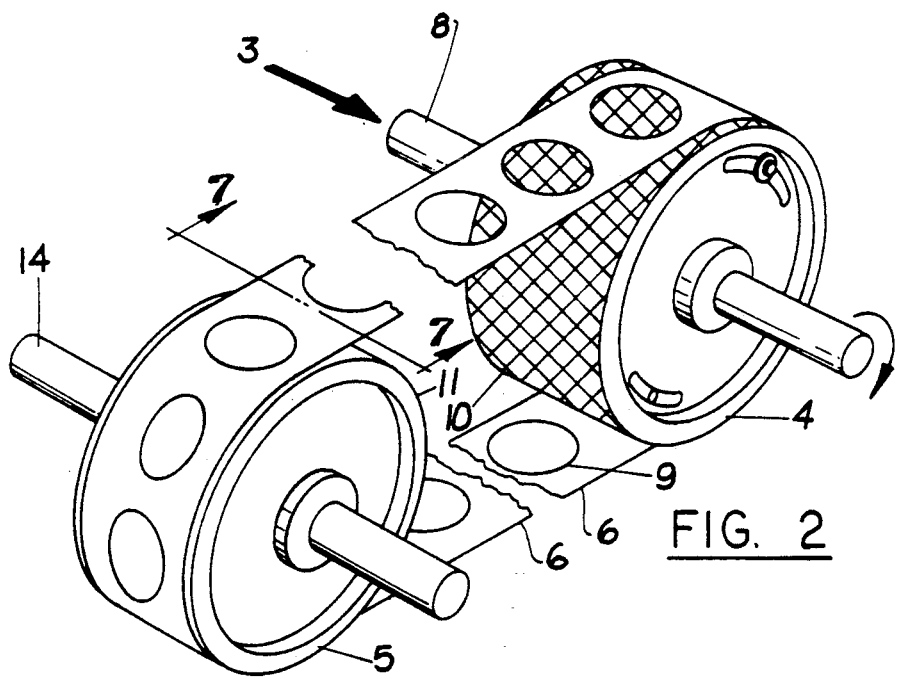
FIG. 2 is a perspective view of a pair of parallel axes drums and a fragment of a belt in operative relation thereto.

Referring to FIG. 2, a perspective view of driven drum 4 and idler drum 5, as well as a fragmentary view of belt 6 is shown. Drums 4 and 5 have peripheral surfaces 10 and 11, respectably The peripheral, or circumferential, surface 10 of driven drum 4 is shown as being textured, as indicated by the crossed hatched lines of FIG. 2.

Figure 3:
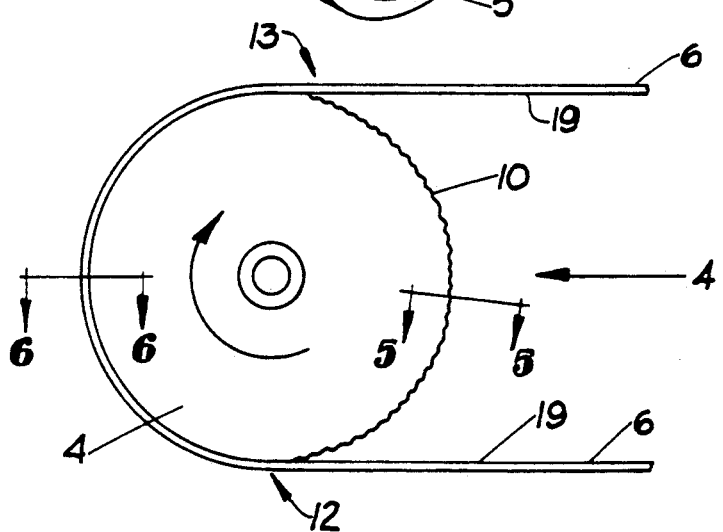
FIG. 3 is a side view of the driven drum and a fragment of a belt in operative relation thereto.

FIG. 3 is a view of driven drum 4 along line 3 of FIG. 2. Belt 6 is shown in partial contact with peripheral surface 10 of driven drum 4, of about 180 degrees of the peripheral surface 10. The texturing of peripheral surface 10 encompasses the entire 360 degrees about the peripheral surface 10 of driven drum 4. As driven drum 4 is rotated in a clockwise direction as indicated in FIG. 3, belt 6 comes into contact with peripheral surface 10 approximately at location 12. A particular element or section of belt 6 which has come into contact with peripheral surface 10 at location 12 rotates in unison with drum 4 through approximately 180 degrees with no relative slippage between the particular section or element of belt 6 and peripheral surface 10 of driven drum 4. After approximately 180 degrees of rotation, the particular section or element of belt 6 will travel out of contact with peripheral surface 10 at location 13. If the idler drum 5 is of a different diameter than driven drum 4, the degrees of contact will be greater than or less than 180 degrees in correspondence to an idler drum diameter which is less than or greater than the diameter of driven drum 4, respectably. In the present invention, it is contemplated that idler drum 5 will have approximately the same diameter as driven drum 4. Tension in belt 6 is controlled by the spacing of shaft 14 of idler drum 5 relative to shaft 8 of driven drum 4.

Figure 4A:
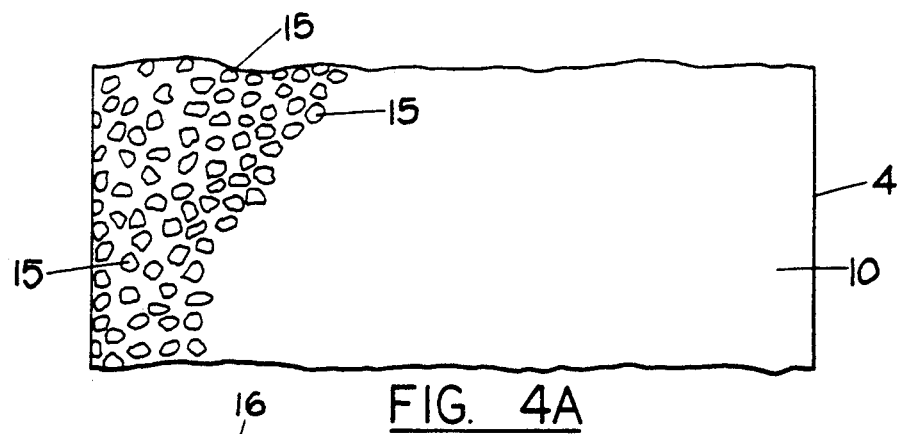
FIG. 4A is a view taken along line 4 of FIG. 3 showing the surface texture of the driven drum.
Figure 4B:
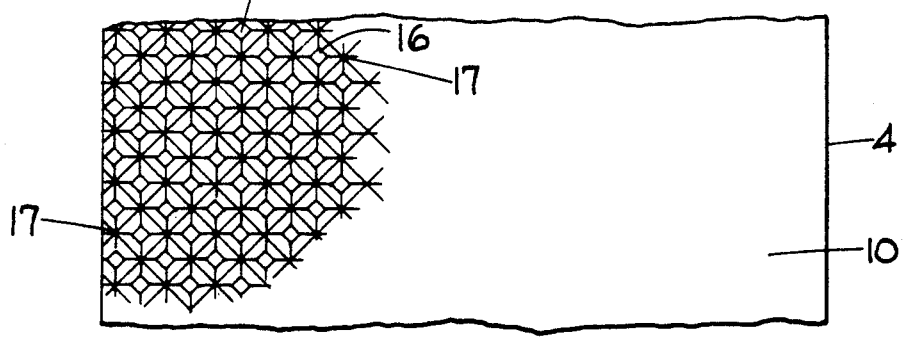
FIG. 4B is a view taken along line 4 of FIG. 3 of an alternative surface texture of the driven drum.

The texturing of peripheral surface 10 of driven drum 4 is schematically detailed in FIGS. 4A and 4B. The textured peripheral surface 10 of driven drum 4 comprises a multitude of high points and low points which form the composite peripheral surface 10. To create such high points and low points on a localized basis, peripheral surface 10 may be so textured by a variety of processes. One such process is to form randomly located, non-uniformly spaced depressions in peripheral surface 10 as indicated in FIG. 4A. This may be accomplished by etching or particle blasting, such as sand blasting, the peripheral surface 10 of driven drum 4 FIG. 5A, which is a cross-section of peripheral surface 10 taken along line 5—5 of FIG. 3, schematically shows these localized depressions 15 formed by etching or particle blasting as comprising localized reliefs 15 of varying shapes and depths formed into the peripheral surface 10. FIG. 4A, which is a view of the peripheral surface 10 taken along line 4 of FIG. 3, shows the random spacing of localized depressions 15 and the accompanying non-uniform shape and cross-section.

Figure 5A:
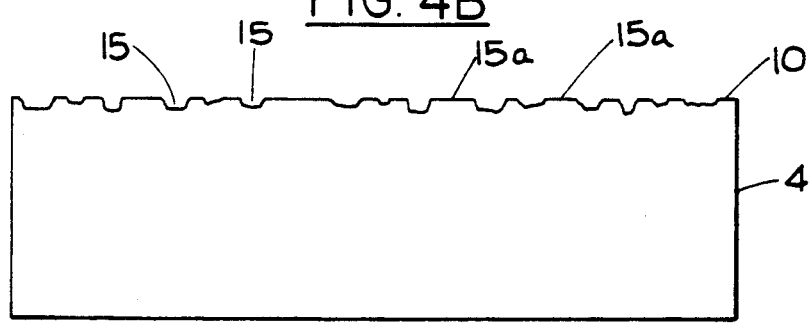
FIG. 5A is a cross-sectional view of the driven drum taken along line 5—5 of FIG. 3.
Figure 5B:
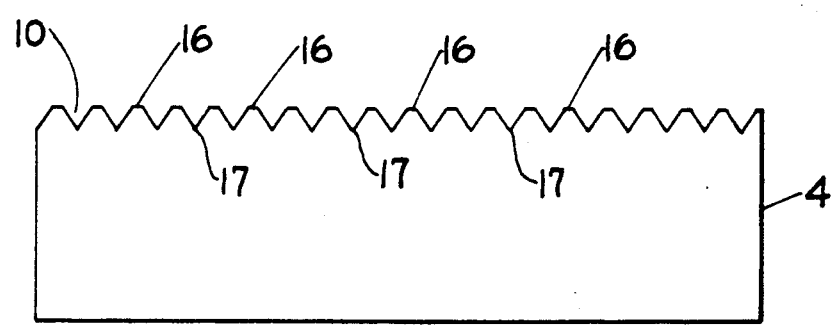
FIG. 5B is a cross-sectional view of an alternative drum according to FIG. 4B, taken along line 5—5 of FIG. 3.

The resulting textured surface created by an alternative process is shown in FIGS. 4B and 5B. In this alternative process, the localized high points 16 are formed in a uniform pattern of substantially uniform height. The localized depressions 17 are also formed in a substantially uniform depth and location. This surface can be formed by knurling the peripheral surface 10, resulting in the uniform pattern. It should be noted that by use of various tools to knurl peripheral surface 10, a less uniform, non-repeating surface may also be formed.

Figure 7A:
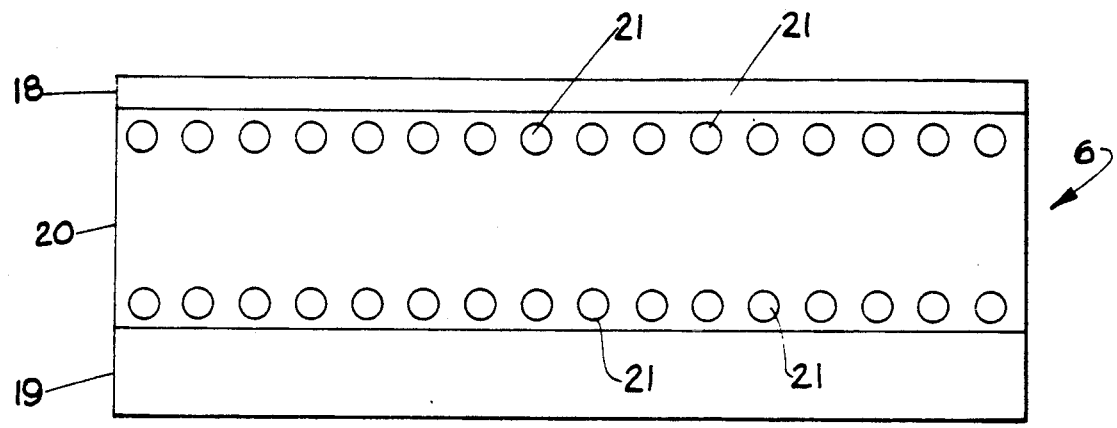
FIG. 7A is a cross-sectional view of a belt taken along line 7—7 of FIG. 2.

Referring now to FIG. 7A, which is a cross-section of belt 6 taken along line 7—7 of FIG. 2, belt 6 is shown as formed of three sections: an outer surface 18; an inner surface 19; and a middle portion 20. To maintain the belt's substantially non-stretchable characteristic, a plurality of non-stretch elements 21 are integrally formed in middle portion 20. Outer surface 18 and inner surface 19 are bonded to middle portion 20. Not shown in FIG. 7A, but generally indicated in FIGS. 1 and 2 are article receiving apertures 9 formed in the belt 6. As shown in FIG. 3, inner surface 19 is in direct contact with peripheral surface 10 of driven drum 4.

Figure 7B:
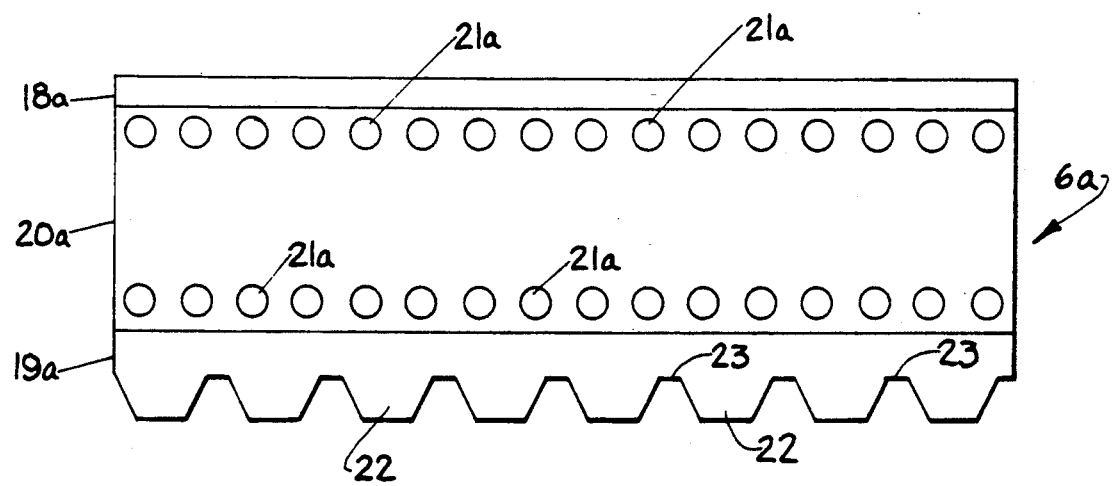
FIG. 7B is a cross-sectional view of an alternative belt taken along line 7—7 of FIG. 2.

Referring to FIG. 7B, there is shown a cross-sectional view of an alternative embodiment of belt 6, again taken along 7—7 of FIG. 2. Belt 6A is comprised of an outer surface 18A, an inner surface 19A and a middle portion 20A. Embedded in middle portion 20A is a plurality of non-stretch elements 21A, which gives belt 6A its substantially non-stretchable characteristics. Inner surface 19A it is shown formed of a plurality of longitudinal ribs 22 (shown here in cross-section to their longitudinal axes). As used in the specification and claims, a rib is an elongated elevation having a form notably long in comparison to its width. The ribs comprise a plurality of root portions 23 and tip portions 24. As shown in this particular embodiment of belt 6A, the tip portions 24 are flat and generally co-planer with each other, forming an inner surface comprised of tip portions 24 which is generally parallel to the outer surface. The flat portions of tips 24 result in the cross-sectional shape of the ribs 22 being a truncated triangle.

In order to drive a belt by a drum such as is disclosed herein at a constant speed, it is necessary that the force between the driven drum and the belt, at the radius of the driven drum, produce sufficient torque to overcome the drag torque of the idler drum. However, when the application requires rapid acceleration or deceleration of the belt without allowing slippage between the driven drum and the belt, as is required in the present article transfer apparatus, the force between the peripheral surface of the driven drum in the inner surface of the belt must be sufficient to overcome the drag torque of the idler drum and to provide the required angular acceleration and deceleration of the idler drum, belt and articles disposed on the belt based on the moments of inertia thereof.

In order to prevent relative movement between the inner surface of the belt which is in contact with the peripheral surface of a driven drum, i.e. prevent slippage, the force therebetween must be sufficient to accelerate and decelerate the components of the article transfer apparatus.

As shown in the drawings and the detailed description heretofore, the preferred embodiments comprise, in part, the use of a non-metallic, substantially non-stretchable belt 6 or 6A, having an inner surface 19 or 19A, respectably, which is in contact with a textured peripheral surface 10 of the driven drum 4 of the article feeding apparatus 1.

Figure 6A:
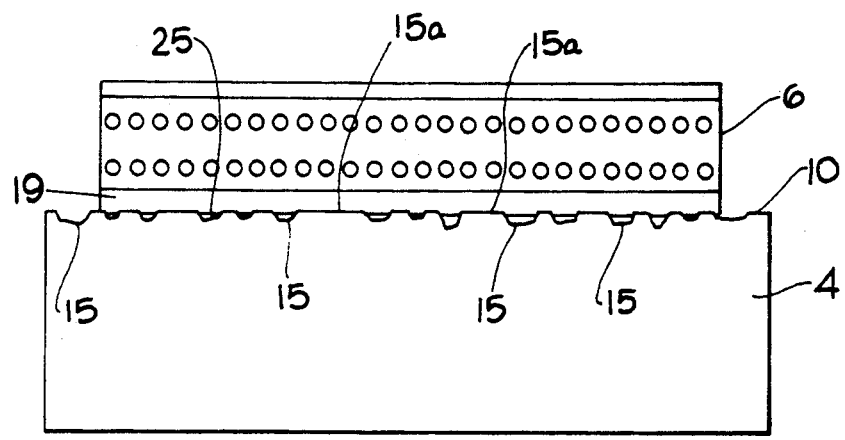
FIG. 6A is a cross-sectional view taken along line 6—6 of FIG. 3 of a belt in contact with the textured surface of the driven drum.

Referring now to FIGS. 6A, 6B, 6C, and 6D, various combinations of belts 6 and 6A, with textured peripheral surface 10 formed by processes as detailed in FIGS. 4A and 5A, and FIGS. 4B and 5B, and described above, are shown. FIG. 6A is a cross-sectional view taken along line 6—6 of FIG. 3, which shows inner surface 19 of belt 6 in direct contact with textured peripheral surface 10 of driven drum 4. As shown somewhat schematically, a plurality of localized portions 25 of inner surface 19 extend into the openings of depressions 15, thereby intermeshing with the textured peripheral surface 10. By adjusting the tension in belt 6 through the position of idler drum 5 relative to driven drum 4, the depth of intermeshing of localized portions 25 of inner surface 19 with depressions 15 can be varied.

The textured peripheral surface 10 of driven drum 4 has been shaped by the process of etching or particle blasting to form a multitude of high and low points. The resultant depressions 15 create a decrease in the total direct contact surface area between the inner surface 19 of the belt 6 and the high points of textured peripheral surface 10 of driven drum 4. The lower contact surface area, when used with some belt tension, and therefore the same normal force between the belt 6 and the peripheral surface 10, results in raising the localized pressure on the inner surface 19 of the belt 6. This causes a localized elastic deformation of the inner surface 19, which results in intermeshing portions 25 of the belt extending below the level of the high points 15A of textured peripheral surface 10. Accordingly, the force between the inner surface 19 of belt 6 and textured peripheral surface 10 in the longitudinal (or circumferential) direction is no longer the result of simple frictional forces which are present when two flat surfaces abut one another, but rather is a result of two intermeshing surfaces which require a large longitudinal force in order to cause relative motion, or slippage, therebetween.

Thus, through the position of idler drum 5 relative to driven drum 4, the tension in belt 6 may be adjusted such that the intermeshing portions 25 of inner surface 19 create sufficient inter-surface forces to prevent slippage therebetween. An additional feature of the preferred embodiment is the formation of inner surface 19 from compounds having a relatively low durometer hardness. These "softer" compounds require less normal force between the inner surface 19 of belt 6 and textured peripheral surface 10 in order to create the same intermeshing depth of intermeshing portion 25 into depression 15. This allows a lower tension to be present in belt 6, resulting in longer service life of belt 6.

Figure 6B:
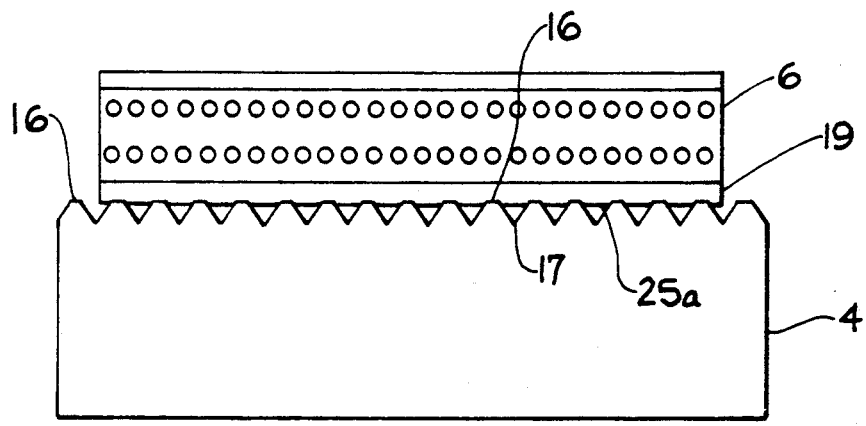
FIG. 6B is a cross-sectional view taken along line 6—6 of FIG. 3 showing the belt in contact with the alternative textured drum peripheral surface shown in FIGS. 4B and 5B.

FIG. 6B shows an alternate combination of belt 6 having inner surface 19 in contact with textured peripheral surface 10 formed by the knurling process, as shown in FIGS. 4B and 5B, and described above. Again, the normal force between belt 6 and driven drum 4 results in localized elastic deformation of inner surface 19 of belt 6, thereby resulting in a plurality of intermeshing portions 25A extending below the level of high points 16 of textured peripheral surface 10. As described above in conjunction with FIG. 6A, the tension in belt 6, and therefore the normal force between belt 6 and driven drum 4, is adjusted such that the intermeshing depth of intermeshing portions 25A are sufficient to prevent relative motion, or slippage, therebetween. Also as described above, the inner surface 19 may be formed of a compound having a relatively low durometer hardness, allowing the use of lower tension in belt 6.

Figure 6C:
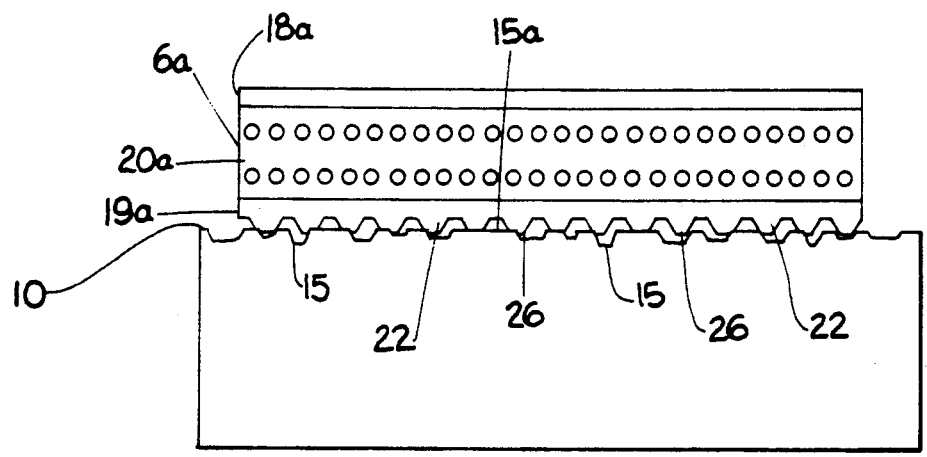
FIG. 6C is a cross-sectional view taken along line 6—6 in FIG. 3 showing an alternative embodiment of the belt in contact with the drum surface shown in FIGS. 4A and 5A.

Referring now to FIG. 6C, article transfer belt 6A, as described above and shown in FIG. 7B as having a plurality of longitudinal ribs formed in inner surface 19A, is shown in contact with the textured peripheral surface 10 of driven drum 4, which has been formed by etching or particle blasting as shown in FIGS. 4A and 5A. FIG. 6C is a cross-section taken along line 6—6 of FIG. 3, and depicts an additional alternative embodiment of the present invention. Similar to the description above in conjunction with FIG. 6A and 6B, the textured peripheral surface 10 is formed of a multitude of high points and low points, which creates a decrease in a total contact surface area between the belt and the driven drum. The formation of longitudinal ribs 22 in the inner surface 19A of belt 6A creates a further decrease in the total contact surface area between the inner surface 19A of the belt 6A and the textured peripheral surface 10. This results in a further increase in the localized pressure on the inner surface of the belt where it is in contact with the high points of the driven drum, for a given tension on the belt. The localized pressure is significantly higher than the localized pressure which would be present if the driven drum and the inner surface of the belt both had relatively smooth uniform finishes and the belt were maintained at the same tension. The high localized unit loading causes elastic deformation of the rib tips 24, resulting in intermeshing portions 26 extending into randomly located depressions 15. The longitudinal force between the belt 6A and the driven drum 4 is no longer the result of simple frictional forces of two flat surfaces abutting one another, but rather is the result of two intermeshing surfaces, thereby requiring a large force in order to cause relative motion, or slippage, therebetween. Because of the ribbed formation of inner surface 19A, which results in less contact surface area with textured peripheral surface 10, less tension is required on the belt than would be required to achieve the intermeshing depth of intermeshing portions 26 necessary to prevent slippage.

Figure 6D:
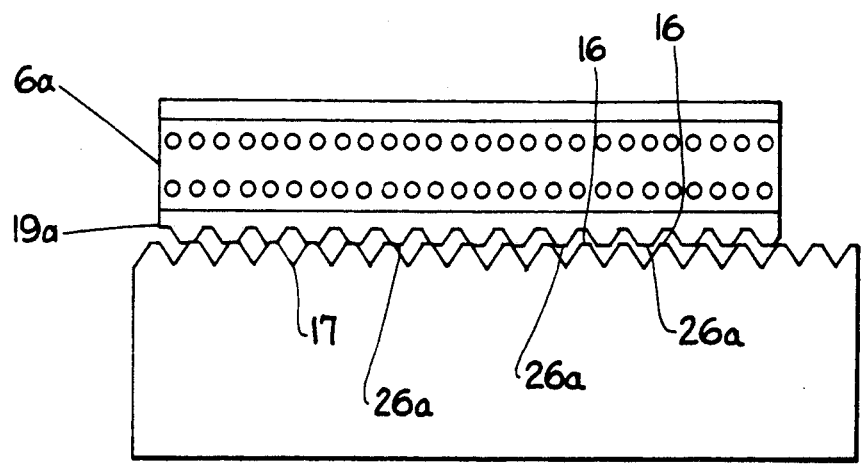
FIG. 6D is a cross-sectional view taken along line 6—6 of FIG. 3 showing an alternative belt in contact with the alternative textured surface of FIGS. 4B and 5B.

Referring now to FIG. 6D, there is shown the longitudinally ribbed belt 6A in combination with the knurled textured peripheral surface 10 of driven drum 4 (shown in FIGS. 4B and 5B). The principle of operation and relative forces are the same as described above with respect to the configuration shown in FIG. 6C. Localized elastic deformation of the tips 24 of inner surface 19A result in intermeshing portions 26A. As before, the tension in the belt is adjusted through idler drum 5 to provide sufficient inter-surface forces to prevent relative motion, or slippage, therebetween.

Figure 8:
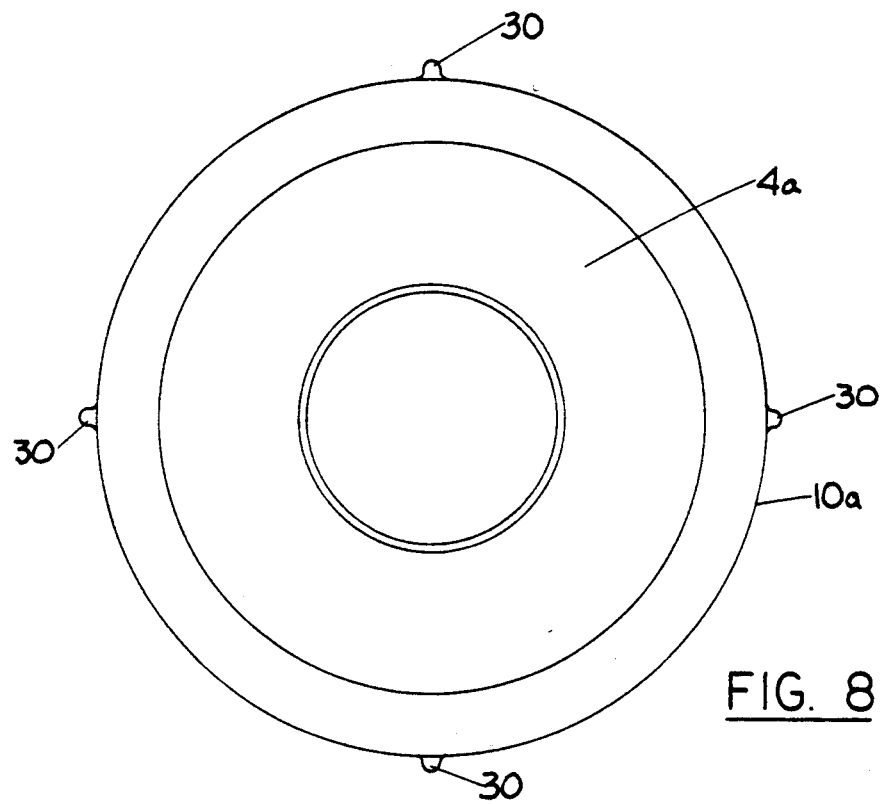
FIG. 8 is an end view of a driven drum showing axial ribs extending radially outward from the peripheral surface of the drum.
Figure 9:
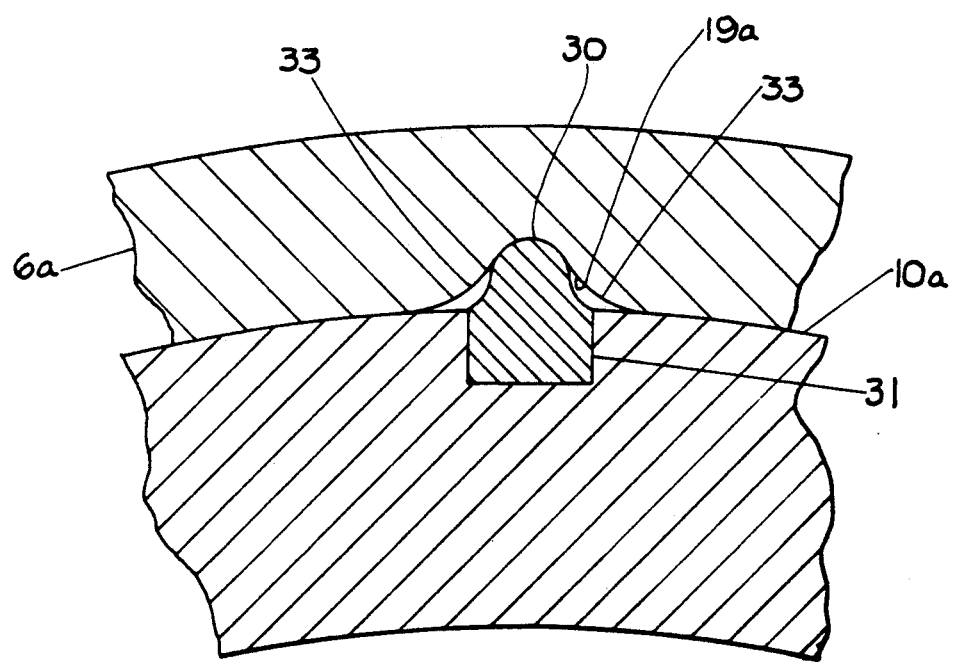
FIG. 9 is an enlarged fragmentary end view of the drum according to FIG. 8 in contact with a belt having an inner surface formed of a plurality of longitudinal ribs.

Referring now to FIG. 8, there is shown an additional alternative embodiment of the present invention, also utilizing localized elastic deformation of the inner surface of the article transfer belt to create sufficient inter-surface forces to prevent slippage therebetween, while maintaining an acceptable tension in the belt so as to maximize service life. FIG. 8 is an end view of driven drum 4B taken along its axis of rotation A plurality of radially extending ribs 30 are shown disposed axially about driven drum 4a. As used in the specification and claims, ribs which are disposed axially about the peripheral surface of the driven drum are defined to be ribs extending in a direction substantially parallel to the axis of rotation of the drum. As shown in FIG. 9, ribs 30 are formed of inserts which are retained in notches 31 formed in the peripheral surface 10a of driven drum 4B. Article transfer belt 6A, having longitudinal ribs formed in the interior surface 19A, is shown in contact with peripheral surface 10a. Localize deformation of the internal surface 19A of belt 6A is shown at 33, caused by the outward projection of rib 30. Rib 30 protrudes from peripheral surface 10a a predetermined distance to cause localize elastic deformation, as shown at 33, sufficient to create adequate longitudinal forces between belt 6a and peripheral surface 10a so as to prevent slippage therebetween.

In this embodiment, based on principles similar to those described above, the driven drum 4a intermeshes with interior surface 19A causing localize elastic deformation. The use of longitudinal ribs allow sufficient deformation of internal surface 19A so as not to cause the belt to "bridge" rib 30. If bridging were to occur, the diametrical pitch of the driven drum 4a at rib 30 would change. In order to assure accurate article positioning, the diametrical pitch must be accurately and uniformly maintained throughout the arc of contact between the belt 6a and peripheral surface 10a.

A belt similar to belt 6, described above, having a relatively smooth interior surface 19 may also be used in combination with axially disposed ribs 30. Preferably belt 6 in such a combination would have an inner surface 19 formed of a material having a relatively low durometer hardness which would allow localized elastic deformation as shown at 33 in FIG. 9. As the durometer hardness of interior surface 19 increases, the tension in the belt required to prevent bridging increases, thereby resulting in shorter service life of the belt.

Axially disposed ribs 30 may also be used in combination with a textured peripheral surface. This combination includes the intermeshing between radially outward extending axially disposed ribs with the belt and the intermeshing between the inner surface of the belt as it extends below the high points of the textured peripheral surface.

Figure 10:
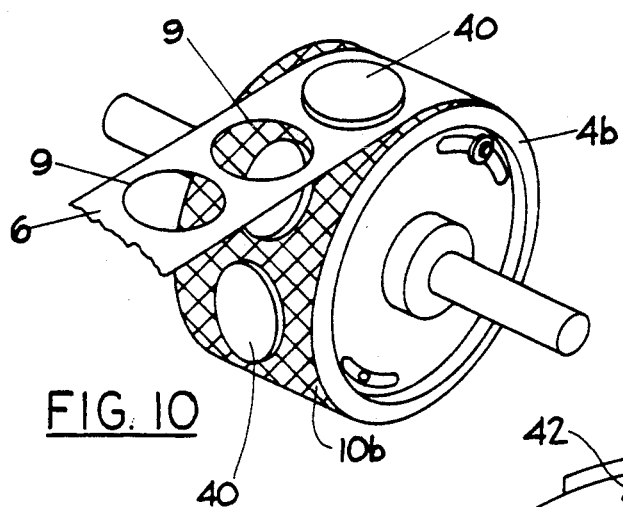
FIG. 10 is a perspective view of a drum and a fragment of a belt in operative relation thereto, showing the use of plugs in combination with a textured peripheral surface.

FIG. 10 schematically illustrates another alternative embodiment of the present invention. Radially outward extending plugs 40 of a shape complimentary to the aperture openings 9 of belt 6 are disposed about the textured peripheral surface 10b of driven drum 4b. In this configuration, the forces created by intermeshing portions of the interior surface of belt 6 and textured peripheral surface 10b are sufficient to drive belt 6. Plugs 40 provide the force necessary to prevent relative motion between belt 6 and driven drum 4b by intermeshing with aperture openings 9 in belt 6. Because plugs 40 intermesh with apertures 9, no localized elastic deformation of belt 6 is necessary. Belt 6a having a longitudinally ribbed inner surface may also be used with driven drum 4b. Plugs 40 are configured complimentary to apertures 9 to fit snugly into the apertures 9.

Figure 11:
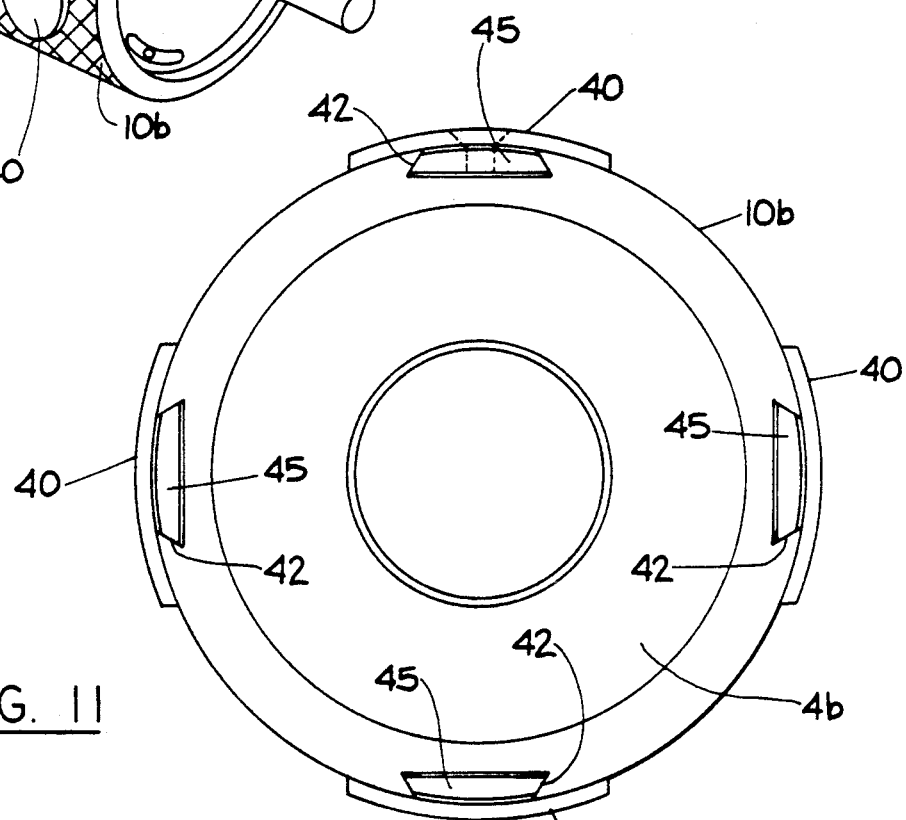
FIG. 11 is an end view of the driven drum showing radially oriented plugs attached to the peripheral surface of the driven drum of FIG. 10.
Figure 12:
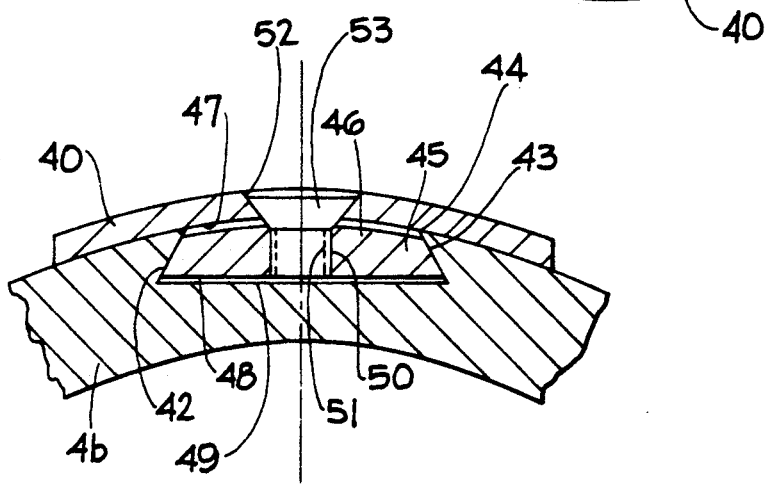
FIG. 12 is a fragmentary enlarged view of the dove-tail notch and insert mounting of the peripheral plugs of FIG. 10.

FIG. 11 is a schematic cross-sectional view taken along the axis of rotation of driven drum 4b shown in FIG. 10. FIG. 12 details the attachment of plugs 40. For each plug 40 disposed about peripheral surface 10b of driven drum 4b, there is an associated dove-tail shaped notch 42 recessed in the peripheral surface 10b of drum 4b. As is typical with "dove-tail" construction, the notch has radially outward converging side walls 43 terminating at 44 in peripheral surface 10b. The second components of the dove-tail assemblies are the dove-tail inserts 45, which are of complementary shape to the converging side walls 43 of the dove-tail notch 42. The inserts are of a thickness such that when disposed complimentarily within the dove-tail notch, the outer surface 46 does not contact the inner surface 47 of plug 40, and the inner surface 48 of insert 45 does not contact the bottom surface 49 of dove-tail notch 42.

Dove-tail insert 45 defines a round opening 50 which has internal threads 51 formed therein. While a plurality of openings 50 may be formed in a single dove-tail insert 45, only a single opening 50 is shown. Corresponding to opening 50 is an opening 52 defined by plug 40 which is configured to complementary to opening 50 in dove-tail insert 45. A threaded fastener 53, such as a bolt or a screw, passes through opening 52 in plug 40 and is disposed in threaded engagement with internal threads 51 of opening 50. As is well known in the art, by tightening the threaded fastener 53 into engagement, plug 40 may be secured immovably adjacent the peripheral surface 10b of driven drum 4b by the camming action of dove-tail insert 45 as it is urged radially outward against radially converging walls 43 of dove-tail notch 42.

This dove-tail mounting arrangement as described above for plugs 40 allows axial alignment of plugs 40 with a minimum of adjustment. By loosening threaded fastener 53, dove-tail insert 45 may be positioned axially so as to align belt 6 with the series of work stations provided adjacent the article feed apparatus. The length of dove-tail insert 45 is less than the length of dove-tail notch 42 by an amount sufficient to allow adequate axial alignment of plugs 40 about the peripheral surface 10b of driven drum 4b.

The foregoing description of preferred embodiments of the invention has been presented for purposes of illustration and description. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. An apparatus for intermittently feeding a series of like articles along a path so as to present them in succession to a plurality of operation stations where operations are performed upon said articles in sequence, of the type having at least one pair of spaced drums mounted respectively on parallel axes of rotation, each of said drums having a respective peripheral surface, one of said drums being a driven drum, a substantially non-stretchable belt passing around said drums, said belt having an inner surface, said inner surface being at least partially in direct contact with at least part of said peripheral surface of said driven drum, said peripheral surface of said driven drum being substantially non-deformable when subjected to the normal operating tension of said belt, and means for intermittently driving said driven drum whereby to move said belt intermittently a predetermined distance, the improvement, in combination therewith, wherein said driven drum has a plurality of ribs disposed axially about said peripheral surface of said driven drum, each of said ribs having a form notably long in comparison to its width, said ribs extending radially outward from said peripheral surface of said driven drum.

2. The apparatus as claimed in claim 1 wherein said inner surface of said belt is formed of a material which has a low durometer hardness.

3. The apparatus as claimed in claim 1 further comprising a plurality of longitudinal ribs formed in said inner surface of said belt.

4. The apparatus as claimed in claim 3 further comprising a plurality of equally spaced article receiving apertures defined by said belt, said apertures being of a shape to fit said articles, and a plurality of equally spaced plugs disposed about said peripheral surface of said driven drum, each of said plugs extending radially outward from said peripheral surface, each of said plugs configured to fit snugly into a corresponding aperture when said belt is in contact with said driven drum.

5. The apparatus as claimed in claim 3 wherein said peripheral surface of said driven drum is textured, said textured peripheral surface configured to cooperate with said inner surface of said belt, whereby slippage between said belt and said driven drum is prevented.

6. The apparatus as claimed in claim 5 further comprising a plurality of equally spaced article receiving apertures defined by said belt, said apertures being of a shape to fit said articles, and a plurality of equally spaced plugs disposed about said peripheral surface of said driven drum, each of said plugs extending radially outward from said peripheral surface, each of said plugs configured to fit snugly into a corresponding aperture when said belt is in contact with said driven drum.

7. An apparatus for intermittently feeding a series of like articles along a path so as to present them in succession to a plurality of operation stations where operations are performed upon said articles in sequence, of the type having at least one pair of spaced drums mounted respectively on parallel axes of rotation, each of said drums having a respective peripheral surface, one of said drums being a driven drum, a substantially non-stretchable belt passing around said drums, said belt having an inner surface, said inner surface being at least partially in direct contact with at least part of said peripheral surface of said driven drum, said peripheral surface of said driven drum being substantially non-deformable when subjected to the normal operating tension of said belt, and means for intermittently driving said driven drum whereby to move said belt intermittently a predetermined distance, said belt being driven by said driven drum at an operating pitch diameter, said operating pitch diameter being substantially equal to the diameter of said driven drum, said driven drum having a plurality of ribs disposed axially about said peripheral surface of said driven drum, each of said ribs having a form notably long in comparison to its width, said ribs extending radially outward from said peripheral surface of said driven drum.

8. An apparatus for intermittently feeding a series of like articles along a path so as to present them in succession to a plurality of operation stations where operations are performed upon said articles in sequence, of the type having at least one pair of spaced drums mounted respectively on parallel axes of rotation, each of said drums having a respective peripheral surface, one of said drums being a driven drum, a substantially non-stretchable belt passing around said drums, said belt having an inner surface, said inner surface being at least partially in direct contact with at least part of said peripheral surface of said driven drum, said peripheral surface of said driven drum being substantially non-deformable when subjected to the normal operating tension of said belt, and means for intermittently driving said driven drum whereby to move said belt intermittently a predetermined distance, said belt being driven by said driven drum at an operating pitch diameter, said driven drum having a plurality of ribs disposed axially about said peripheral surface of said driven drum, each of said ribs having a form notably long in comparison to its width, said ribs extending radially outward from said peripheral surface of said driven drum and elastically deforming portions of said inner surface of said belt when said portions are adjacent said rib without affecting said operating pitch diameter.

9. An apparatus for intermittently feeding a series of like articles along a path so as to present them in succession to a plurality of operation stations where operations are performed upon said articles in sequence, of the type having at least one pair of spaced drums mounted respectively on parallel axes of rotation, each of said drums having a respective peripheral surface, one of said drums being a driven drum, a substantially non-stretchable belt passing around said drums, said belt having an inner surface, said inner surface being at least partially in direct contact with at least part of said peripheral surface of said driven drum, said peripheral surface of said driven drum being substantially non-deformable when subjected to the normal operating tension of said belt, and means for intermittently driving said driven drum whereby to move said belt intermittently a predetermined distance, said belt being driven by said driven drum at an operating pitch diameter, said driven drum including means for substantially preventing slippage between said driven drum and said belt without affecting said operating pitch diameter said means including a plurality of ribs disposed axially about said peripheral surface of said driven drum, each of said ribs having a form notably long in comparison to its width, said ribs extending radially outward from said peripheral surface of said driven drum.

10. An apparatus for intermittently feeding a series of like articles along a path so as to present them in succession to a plurality of operation stations where operations are performed upon said articles in sequence, of the type having at least one pair of spaced drums mounted respectively on parallel axes of rotation, each of said drums having a respective peripheral surface, one of said drums being a driven drum, a substantially non-stretchable belt passing around said drums, said belt having an inner surface, said inner surface being disposed adjacent at least a part of said peripheral surface of said driven drum, said inner surface being in direct contact with at least a major portion of said peripheral surface of said driven drum, said peripheral surface of said driven drum being substantially non-deformable when subjected to the normal operating tension of said belt, and means for intermittently driving said driven drum whereby to move said belt intermittently a predetermined distance, said driven drum having a plurality of ribs disposed axially about said peripheral surface of said driven drum, each of said ribs having a form notably long in comparison to its width, said ribs extending radially outward from said peripheral surface of said driven drum.

* * * * *